(12) United States Patent
Kurokawa

(10) Patent No.: US 12,732,499 B2
(45) Date of Patent: Sep. 8, 2026

(54) INFORMATION PROCESSING DEVICE, INFORMATION PROCESSING METHOD, AND PROGRAM

(71) Applicant: FeliCa Networks, Inc., Tokyo (JP)

(72) Inventor: Atsuo Kurokawa, Kanagawa (JP)

(73) Assignee: FeliCa Networks, Inc., Tokyo (JP)

( * ) Notice: Subject to any disclaimer, the term of this patent is extended or adjusted under 35 U.S.C. 154(b) by 81 days.

(21) Appl. No.: 18/841,390

(22) PCT Filed: Mar. 13, 2023

(86) PCT No.: PCT/JP2023/009515
§ 371 (c)(1),
(2) Date: Aug. 26, 2024

(87) PCT Pub. No.: WO2023/189461
PCT Pub. Date: Oct. 5, 2023

(65) Prior Publication Data

US 2025/0168165 A1 May 22, 2025

(30) Foreign Application Priority Data

Mar. 30, 2022 (JP) ................................ 2022-055003

(51) Int. Cl.
*H04L 29/06* (2006.01)
*H04L 9/40* (2022.01)

(52) U.S. Cl.
CPC ................................ *H04L 63/0876* (2013.01)

(58) Field of Classification Search
None
See application file for complete search history.

(56) References Cited

U.S. PATENT DOCUMENTS 6,607,136 B1 * 8/2003 Atsmon ................ G06Q 20/40
235/487
9,756,044 B2 * 9/2017 Chai .................... H04L 9/3273
(Continued)

FOREIGN PATENT DOCUMENTS

EP 3817278 A1 5/2021
JP 2006-276967 A 10/2006
(Continued)

OTHER PUBLICATIONS

Peng, Siwei. An Id-based Multiple Authentication scheme against attacks in wireless sensor networks. 2012 IEEE 2nd International Conference on Cloud Computing and Intelligence Systems. https://ieeexplore.ieee.org/stamp/stamp.jsp?tp=&arnumber=6664540 (Year: 2012).*

(Continued)

*Primary Examiner* — Jeremiah L Avery
(74) *Attorney, Agent, or Firm* — Paratus Law Group, PLLC

(57) ABSTRACT

There is provided an information processing device, an information processing method, and a program that enable setting regarding a service using a secure element to be appropriately performed according to an expiration date of security authentication of the secure element. Unique identification information for identifying an individual of a secure element mounted on a terminal device and security authentication information assigned to the secure element are stored in association with each other, and to an external device that provides a service by using the secure element of the terminal device, the unique identification information inquired from the external device or the security authentication information for the unique identification information on the secure element used for the service is transmitted.

14 Claims, 6 Drawing Sheets

(56) References Cited

U.S. PATENT DOCUMENTS

| | | | | |
|---|---|---|---|---|
| 10,742,421 | B1 * | 8/2020 | Wentz | H04L 9/0897 |
| 11,068,163 | B1 * | 7/2021 | Leggette | G06F 3/0604 |
| 11,256,792 | B2 * | 2/2022 | Tussy | H04L 63/0861 |
| 11,323,448 | B1 * | 5/2022 | Boding | G06F 11/3409 |
| 2011/0087610 | A1 | 4/2011 | Batada et al. | |
| 2014/0189048 | A1 * | 7/2014 | Messinger | G06F 21/44 709/217 |
| 2015/0007300 | A1 | 1/2015 | Kim | |
| 2016/0099969 | A1 * | 4/2016 | Angus | H04L 63/20 713/158 |
| 2017/0012967 | A1 | 1/2017 | Holloway | |
| 2019/0207953 | A1 * | 7/2019 | Klawe | G06F 21/57 |
| 2019/0312883 | A1 * | 10/2019 | McCarter | G06Q 20/3224 |
| 2019/0349770 | A1 * | 11/2019 | Andres | G06Q 20/027 |
| 2019/0378610 | A1 * | 12/2019 | Barral | G16H 10/65 |
| 2020/0213112 | A1 * | 7/2020 | Singleton, IV | G06F 8/61 |
| 2021/0392135 | A1 * | 12/2021 | Rao | H04L 63/083 |
| 2022/0014389 | A1 * | 1/2022 | Nix | H04L 9/0838 |
| 2022/0108024 | A1 * | 4/2022 | Hamdi | G06F 21/57 |
| 2022/0191249 | A1 * | 6/2022 | Luciano | H04L 67/01 |
| 2022/0255931 | A1 * | 8/2022 | Avetisov | H04L 9/3247 |
| 2022/0294643 | A1 * | 9/2022 | Wang | G06F 21/57 |
| 2022/0417034 | A1 * | 12/2022 | Wang | G06F 21/33 |
| 2023/0052407 | A1 * | 2/2023 | McGrandle | G06Q 20/4014 |
| 2023/0123781 | A1 * | 4/2023 | Kaimal | H04L 43/50 726/12 |

FOREIGN PATENT DOCUMENTS

| | | | |
|---|---|---|---|
| JP | 2006-525574 | A | 11/2006 |
| JP | 2017-097898 | A | 6/2017 |

OTHER PUBLICATIONS

Portnoi, Marcos; Shen, Chien-Chung. Location-enhanced authenticated key exchange. 2016 International Conference on Computing, Networking and Communications (ICNC). https://ieeexplore.ieee.org/stamp/stamp.jsp?tp=&arnumber=7440584 (Year: 2016).*

Li, Ninghui et al. Usable Mandatory Integrity Protection for Operating Systems. 2007 IEEE Symposium on Security and Privacy (SP '07). https://ieeexplore.IEEE.org/stamp/stamp.jsp?tp=&arnumber=4223222 (Year: 2007).*

* cited by examiner

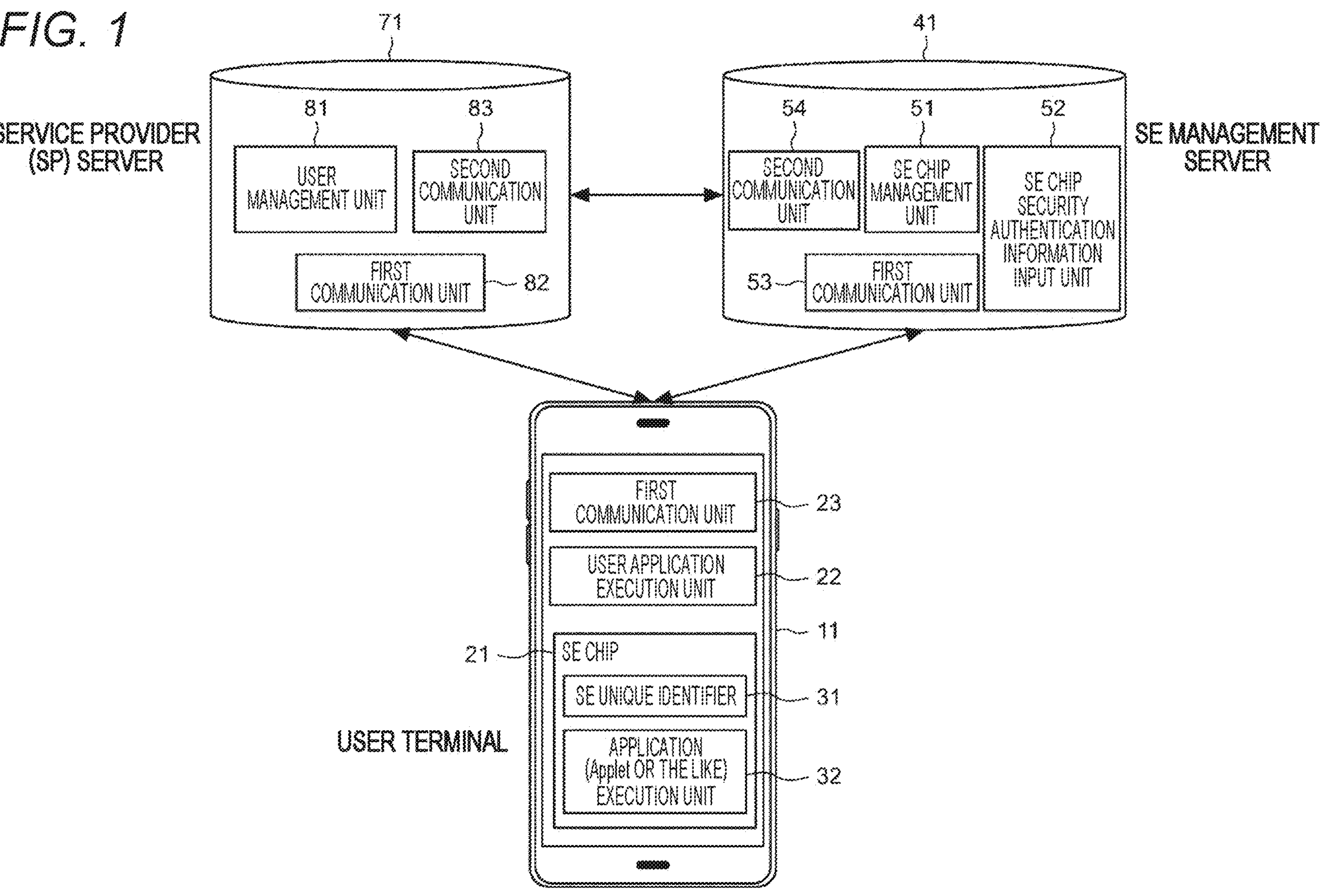
FIG. 1
71
41
SERVICE PROVIDER (SP) SERVER
81
USER MANAGEMENT UNIT
83
SECOND COMMUNICATION UNIT
FIRST COMMUNICATION UNIT
82
54
SECOND COMMUNICATION UNIT
51
SE CHIP MANAGEMENT UNIT
52
SE CHIP SECURITY AUTHENTICATION INFORMATION INPUT UNIT
53
FIRST COMMUNICATION UNIT
SE MANAGEMENT SERVER
FIRST COMMUNICATION UNIT
23
USER APPLICATION EXECUTION UNIT
22
11
21
SE CHIP
SE UNIQUE IDENTIFIER
31
USER TERMINAL
APPLICATION (Applet OR THE LIKE) EXECUTION UNIT
32

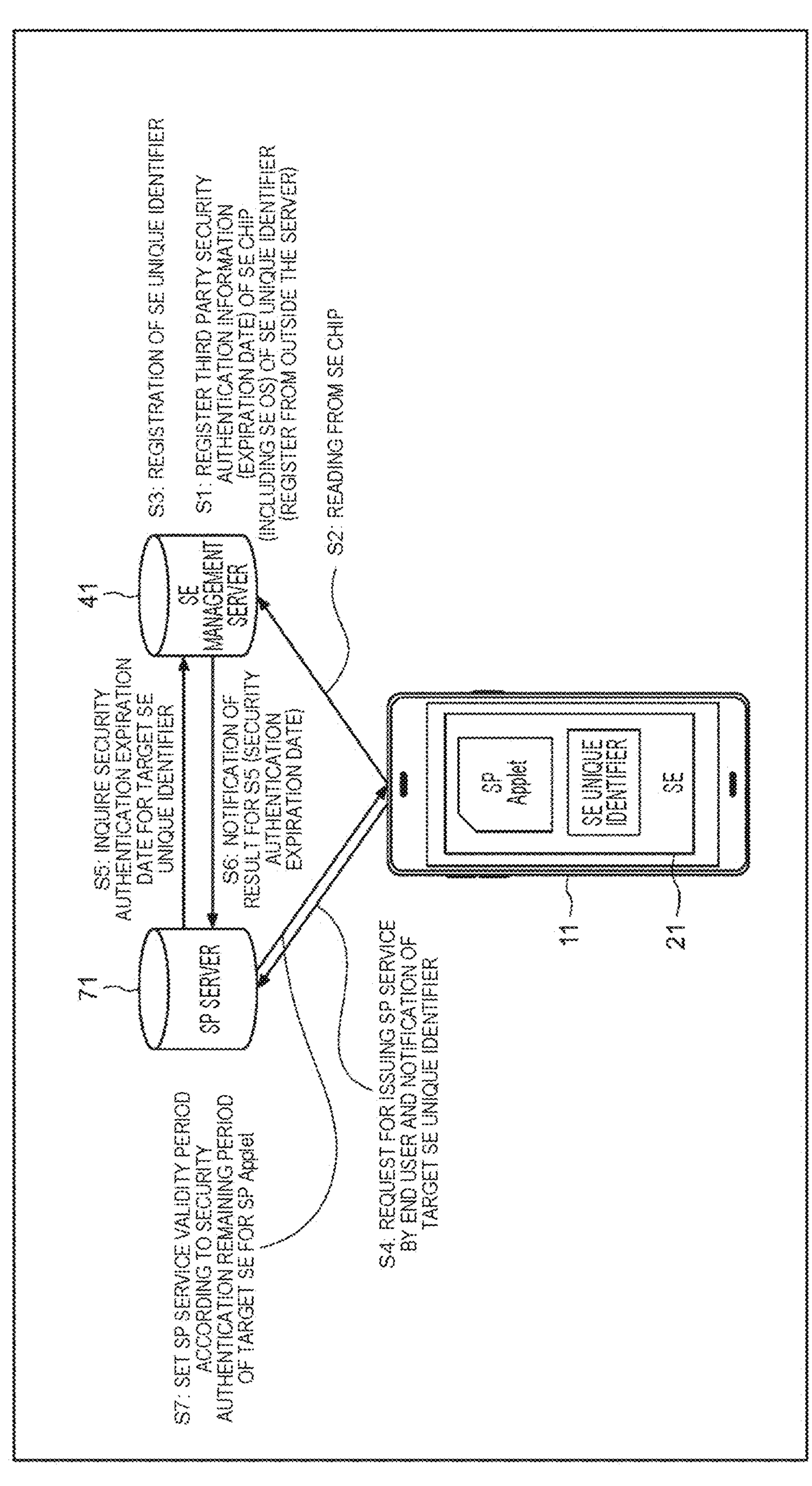
FIG. 2
71
SP SERVER
41
SE MANAGEMENT SERVER
S3: REGISTRATION OF SE UNIQUE IDENTIFIER
S1: REGISTER THIRD PARTY SECURITY AUTHENTICATION INFORMATION (EXPIRATION DATE) OF SE CHIP (INCLUDING SE OS) OF SE UNIQUE IDENTIFIER (REGISTER FROM OUTSIDE THE SERVER)
S2: READING FROM SE CHIP
S5: INQUIRE SECURITY AUTHENTICATION EXPIRATION DATE FOR TARGET SE UNIQUE IDENTIFIER
S6: NOTIFICATION OF RESULT FOR S5 (SECURITY AUTHENTICATION EXPIRATION DATE)
S4: REQUEST FOR ISSUING SP SERVICE BY END USER AND NOTIFICATION OF TARGET SE UNIQUE IDENTIFIER
S7: SET SP SERVICE VALIDITY PERIOD ACCORDING TO SECURITY AUTHENTICATION REMAINING PERIOD OF TARGET SE FOR SP Applet
SP Applet
SE UNIQUE IDENTIFIER
SE
11
21

Figure 3:
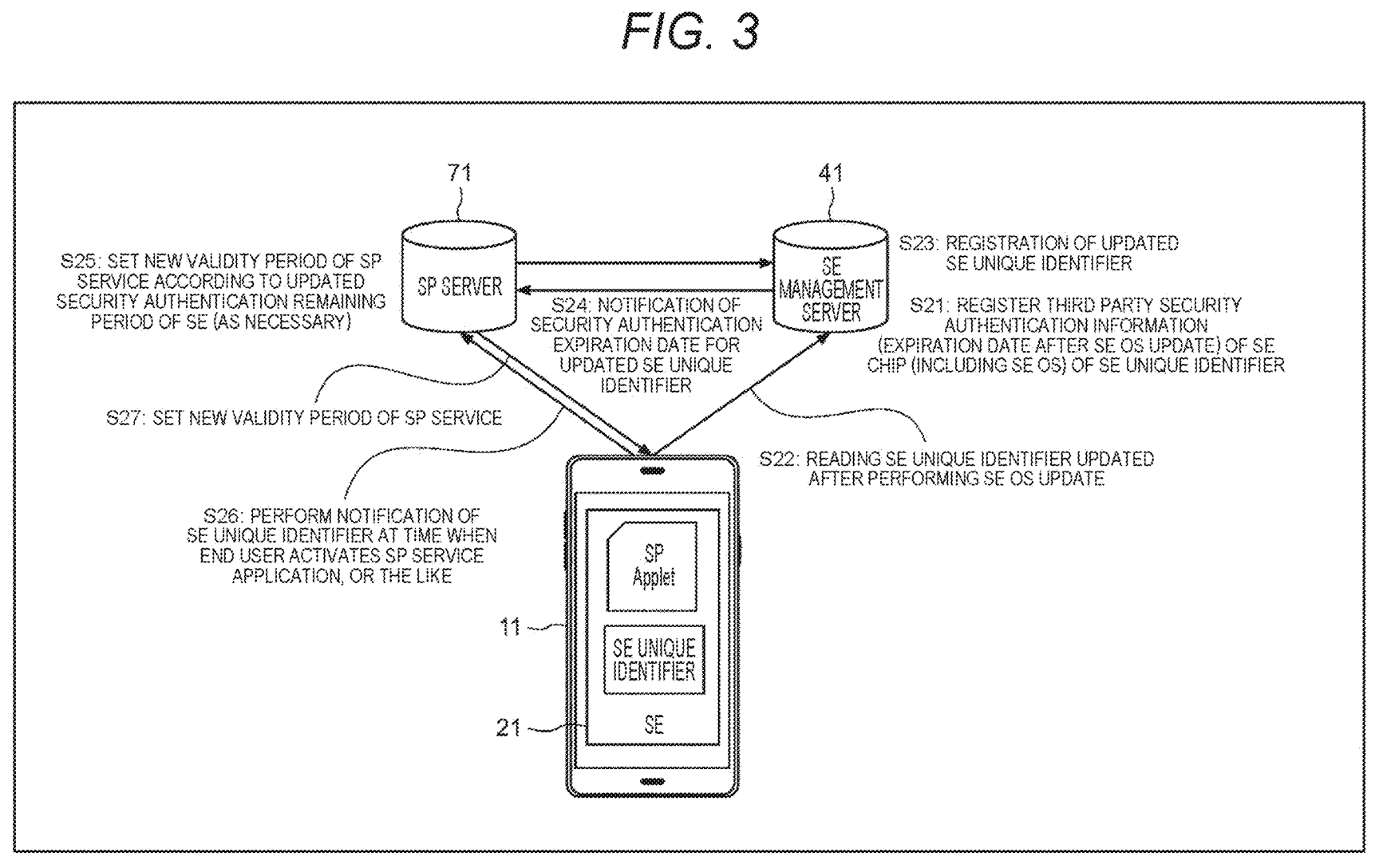

SP SERVER

41

SE MANAGEMENT SERVER

S25: SET NEW VALIDITY PERIOD OF SP SERVICE ACCORDING TO UPDATED SECURITY AUTHENTICATION REMAINING PERIOD OF SE (AS NECESSARY)

S24: NOTIFICATION OF SECURITY AUTHENTICATION EXPIRATION DATE FOR UPDATED SE UNIQUE IDENTIFIER

S23: REGISTRATION OF UPDATED SE UNIQUE IDENTIFIER

S21: REGISTER THIRD PARTY SECURITY AUTHENTICATION INFORMATION (EXPIRATION DATE AFTER SE OS UPDATE) OF SE CHIP (INCLUDING SE OS) OF SE UNIQUE IDENTIFIER

S27: SET NEW VALIDITY PERIOD OF SP SERVICE

S22: READING SE UNIQUE IDENTIFIER UPDATED AFTER PERFORMING SE OS UPDATE

S26: PERFORM NOTIFICATION OF SE UNIQUE IDENTIFIER AT TIME WHEN END USER ACTIVATES SP SERVICE APPLICATION, OR THE LIKE

SP Applet

SE UNIQUE IDENTIFIER

SE

11

21

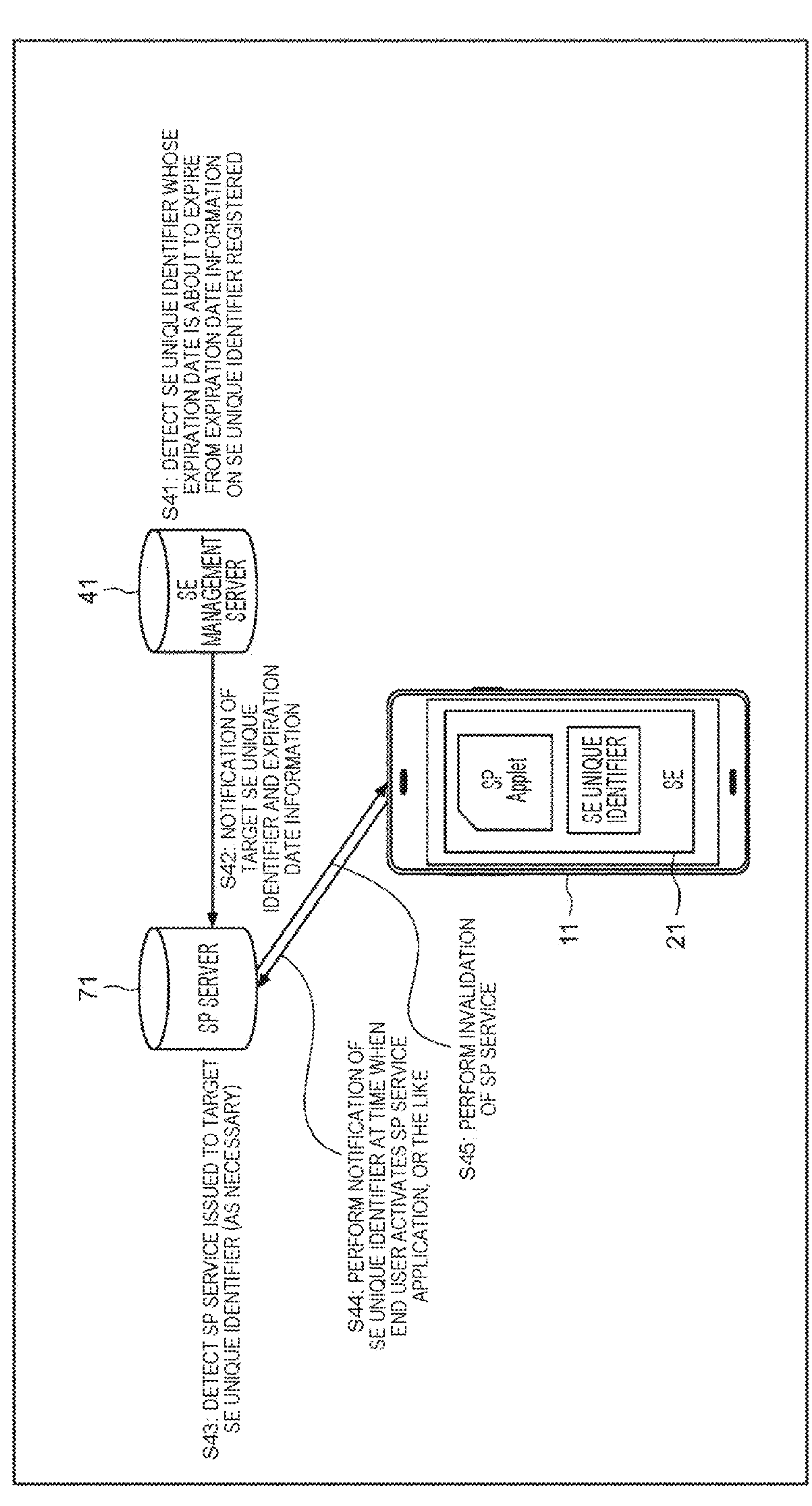
FIG. 4
41
SE MANAGEMENT SERVER
S41: DETECT SE UNIQUE IDENTIFIER WHOSE EXPIRATION DATE IS ABOUT TO EXPIRE FROM EXPIRATION DATE INFORMATION ON SE UNIQUE IDENTIFIER REGISTERED
71
SP SERVER
S42: NOTIFICATION OF TARGET SE UNIQUE IDENTIFIER AND EXPIRATION DATE INFORMATION
S43: DETECT SP SERVICE ISSUED TO TARGET SE UNIQUE IDENTIFIER (AS NECESSARY)
S44: PERFORM NOTIFICATION OF SE UNIQUE IDENTIFIER AT TIME WHEN END USER ACTIVATES SP SERVICE APPLICATION, OR THE LIKE
S45: PERFORM INVALIDATION OF SP SERVICE
SP Applet
SE UNIQUE IDENTIFIER
SE
11
21

201
CPU
202
ROM
203
RAM
204
205
INPUT/OUTPUT INTERFACE
206
INPUT UNIT
207
OUTPUT UNIT
208
STORAGE UNIT
209
COMMUNICATION UNIT
210
DRIVE
211
REMOVABLE MEDIUM

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2023/009515 (filed on Mar. 13, 2023) under 35U.S.C. § 371, which claims priority to Japanese Patent Application No. 2022-055003 (filed on Mar. 30, 2022), which are all hereby incorporated by reference in their entirety.

TECHNICAL FIELD

The present technology relates to an information processing device, an information processing method, and a program, and more particularly, to an information processing device, an information processing method, and a program that enables setting regarding a service using a secure element to be appropriately performed according to an expiration date of security authentication of the secure element.

BACKGROUND ART

Patent Document 1 discloses a mechanism for associating a corresponding secure element (SE) with a server by including a service modifier in processing from instantiation to activation in the SE corresponding to a plurality of service providers.

CITATION LIST

Patent Document

Patent Document 1: Japanese Patent Application Laid-Open No. 2017-097898

SUMMARY OF THE INVENTION

Problems to be Solved by the Invention

A secure element is mounted on an information processing device such as a smartphone, and services are used such as payment using the secure element. However, since third party security authentication having an expiration date such as common criteria is assigned to the secure element, it is necessary to consider the expiration date of the security authentication when setting is performed regarding the service using the secure element.

The present technology has been made in view of such a situation, and enables setting regarding a service using a secure element to be appropriately performed according to an expiration date of security authentication of the secure element.

Solutions to Problems

An information processing device or a program of a first aspect of the present technology is an information processing device including: a storage unit that stores unique identification information for identifying an individual of a secure element mounted on a terminal device and security authentication information described in a security certificate or the like assigned to the secure element in association with each other; and a communication unit that transmits, to an external device that provides a service by using the secure element of the terminal device, the unique identification information inquired from the external device or the security authentication information for the unique identification information on the secure element used for the service, or a program for causing a computer to function as such an information processing device.

An information processing method of the first aspect of the present technology is an information processing method, in which in an information processing device including a storage unit and a communication unit, the storage unit stores unique identification information for identifying an individual of a secure element mounted on a terminal device and security authentication information described in a security certificate or the like assigned to the secure element in association with each other, and the communication unit transmits, to an external device that provides a service by using the secure element of the terminal device, the unique identification information inquired from the external device or the security authentication information for the unique identification information on the secure element used for the service.

In the information processing device, the information processing method, and the program of the first aspect of the present technology, unique identification information for identifying an individual of a secure element mounted on a terminal device and security authentication information described in a security certificate or the like assigned to the secure element are stored in association with each other, and to an external device that provides a service by using the secure element of the terminal device, the unique identification information inquired from the external device or the security authentication information for the unique identification information on the secure element used for the service is transmitted.

An information processing device of a second aspect of the present technology is an information processing device including: an acquisition unit that acquires security authentication information described in a security certificate or the like assigned to a secure element mounted on a terminal device; and a management unit that sets a validity period of a service provided by using the secure element of the terminal device on the basis of the security authentication information.

In the information processing device of the second aspect of the present technology, security authentication information described in a security certificate or the like assigned to a secure element mounted on a terminal device is acquired, and a validity period of a service provided by using the secure element of the terminal device is set on the basis of the security authentication information.

An information processing device of a third aspect of the present technology is an information processing device including a communication unit that transmits, to an external device, unique identification information for identifying an individual of a secure element mounted inside.

In the information processing device of the third aspect of the present technology, unique identification information for identifying an individual of a secure element mounted inside is transmitted to an external device.

BRIEF DESCRIPTION OF DRAWINGS

FIG. 1 is a block diagram illustrating a configuration example of an information processing system according to an embodiment to which the present technology is applied.

FIG. 2 is a diagram illustrating a procedure example of registration of an SE unique identifier of an SE chip 21 of a user terminal and third party security authentication information, and issuing a service such as payment to the SE chip 21 of the user terminal using the third party security authentication information and the SE unique identifier, in the information processing system in FIG. 1.

FIG. 3 is a diagram illustrating a procedure example of updating the security authentication information by update of an SE operating system (OS) after issuing the service such as the payment to the SE chip of the user terminal according to the procedure example in FIG. 2 in the information processing system in FIG. 1.

FIG. 4 is a diagram illustrating a procedure example of processing in a case where an expiration date of the security authentication of the SE chip of the user terminal is about to expire in the information processing system in FIG. 1.

MODE FOR CARRYING OUT THE INVENTION

Figure 5:
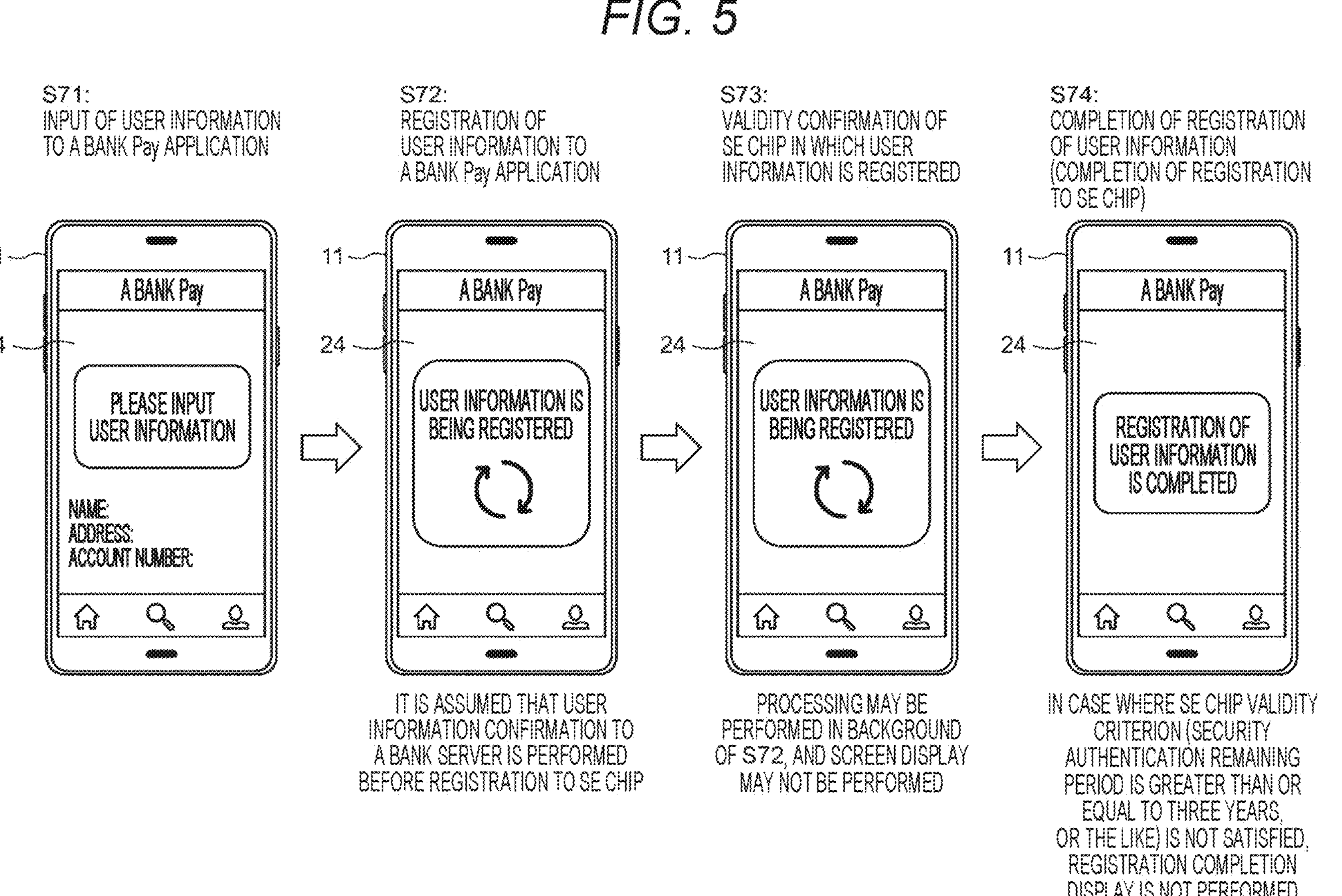
FIG. 5 is a diagram illustrating a procedure example when registration (first registration) for an SP service is performed with the user terminal.

Hereinafter, embodiments of the present technology will be described with reference to the drawings.

Information Processing System According to Present Embodiment

FIG. 1 is a block diagram illustrating a configuration example of an information processing system according to an embodiment to which the present technology is applied. In FIG. 1, the information processing system according to the present embodiment includes a user terminal 11, an SE management server 41, and a service provider (SP) server 71. The user terminal 11 and the SE management server 41, the user terminal 11 and the SP server 71, and the SE management server 41 and the SP server 71 are communicably connected to each other. Communication can include, for example, a wired communication network such as the Internet, a local area network (LAN), or a wide area network (WAN), a wireless communication network such as a mobile communication network or a wireless local area network (WLAN), or a combined communication network. Note that only one of a plurality of user terminals 11 used by a large number (a plurality) of users is illustrated as the user terminal 11. Furthermore, the numbers of the user terminals 11, the SE management servers 41, and the SP servers 71 each are not limited to one.

(User Terminal 11)

The user terminal 11 is, for example, a terminal device such as a smartphone, and executes a program included in installed software (application), thereby executing processing according to the program. The user terminal 11 includes a secure element (SE) chip 21, a user application execution unit 22, and a first communication unit 23.

The SE chip 21 is, for example, an IC chip having tamper resistance including a processor including an arithmetic circuit such as a micro processing unit (MPU), a memory for storing various data, and the like. The SE chip 21 may be either detachable or non-detachable with respect to the user terminal 11, or may be incorporated as a part of an IC chip used for any application such as a subscriber identity module (SIM) card. That is, a secure element (SE) in the SE chip 21 is designed to withstand an analysis attack from the outside (for example, with malicious intent) and is a secure area including a memory for securely storing data, an encryption processing circuit, and the like, and a form in which the user terminal 11 includes the SE is not limited to a specific form. The SE chip 21 includes an SE unique identifier storage unit 31, an application execution unit 32, and the like. The SE unique identifier storage unit 31 stores an SE unique identifier, and the SE unique identifier includes, for example, an individual identifier (identification information different for each SE chip) for each SE chip, an SE chip product identifier (identification information on a chip manufacturer or a product), SE OS version information, and the like. The SE OS version information (version managed by a chip manufacturer) is a version of an OS such as a JavaCard OS that manages and controls the SE. The application execution unit 32 is a processing unit that executes an application (Applet or the like) stored in the memory of the SE chip 21 on the SE OS.

The user application execution unit 22 is a processing unit that executes an application (UI application) operating on an OS such as Android of the user terminal 11 by a host CPU (application processor) of the user terminal 11.

The first communication unit 23 controls communication and is communicably connected (establishes communication connection) to the SE management server 41 and the SP server 71.

(SE Management Server 41)

The SE management server 41 has a configuration of a computer, and executes a program included in installed software (application), thereby mainly performing management of the SE chip 21, for example, area management of the memory of the SE chip 21, installation of an application (Applet or the like) of the SE chip 21, and the like. Furthermore, the SE management server 41 performs management of an expiration date of security authentication of the SE chip 21, and the like. The SE management server 41 includes an SE chip management unit 51, an SE chip security authentication information input unit 52, a first communication unit 53, and a second communication unit 54.

The SE chip management unit 51 executes processing related to management of the SE chip 21. Details will be described later.

In the SE chip security authentication information input unit 52, an administrator or the like inputs security authentication information (information such as an authentication deadline and an SE OS version described in a certificate of third party security authentication) of the SE chip 21 by using an input device such as a keyboard.

The first communication unit 53 controls communication and is communicably connected (establishes communication connection) to the user terminal 11.

The second communication unit 54 controls communication and is communicably connected (establishes communication connection) to the SP server 71.

(SP Server 71)

The SP server 71 has a configuration of a computer, and executes a program included in installed software (application), thereby mainly performing processing related to services (SP services) such as electronic payment, a transportation ticket, and identification provided by the SP server 71. The application (UI application) operating on the OS of the user terminal 11 is an application (UI application) that provides information to the user regarding the SP service using the SE chip 21 or guides the user's operation, and is hereinafter also referred to as an SP application. The SP server 71 includes a user management unit 81, a first communication unit 82, and a second communication unit 83.

The user management unit 81 performs setting of a validity period and the like of the SP service, and the like, on the basis of the security authentication information of the SE chip 21 of the user terminal 11. Note that, as meanings of terms, the period represents a period specified by a start time point and an end time point, and the date represents an end time point of the period; however, in the present specification, in a case where the term validity period or the term expiration date is used, a difference between these terms is not particularly intended, and the expiration date may be set as the validity period, or the validity period may be set as the expiration date. The first communication unit 82 controls communication and is communicably connected (establishes communication connection) to the user terminal 11. The second communication unit 83 controls communication and is communicably connected (establishes communication connection) to the SE management server 41.

Registration of SE Unique Identifier and Security Authentication Information

FIG. 2 is a diagram illustrating a procedure example of registration of an SE unique identifier of the SE chip 21 of the user terminal 11 and third party security authentication information in the information processing system in FIG. 1.

The registration of the SE unique identifier of the SE chip 21 and the third party security authentication information is registration of these pieces of information in the SE management server 41, and is performed with the first activation of the user terminal 11 or the first activation of the SP application as a trigger.

First, as a premise, the SE unique identifier (unique identification information for identifying an individual of the SE chip 21) is written in the memory (SE unique identifier storage unit 31) in the SE chip 21 before shipping in the SE chip 21 of the user terminal 11, and then the SE chip 21 is mounted on the user terminal 11. The SE unique identifier includes the following information.

- Individual identifier for each SE chip
- SE chip product identifier (identification of chip manufacturer and product)
- SE OS version information (version managed by chip manufacturer)

In step S1, the SE management server 41 (SE chip management unit 51) registers third party security authentication information (simply referred to as security authentication information) of the SE chip to be managed from the SE chip security authentication information input unit 52. In this registration, the administrator or the like obtains the information from the chip manufacturer or the like and manually inputs the information. The security authentication information to be input may be only information on an expiration date of security authentication for the SE chip product identifier to be managed. Note that, in a case where the security authentication information for the SE chip 21 of the SE unique identifier can be acquired by another server or the like that manages the security authentication information, the security authentication information may be input from the server to the SE chip security authentication information input unit 52 by communication.

Here, the security authentication information represents, for example, information described on a certificate in which a third party has evaluated and authenticated that security requirements determined in advance are satisfied regarding security functions of hardware and the SE OS of the SE chip 21. For example, in ISO/IEC 15408 (Common Criteria), a common evaluation criterion for performing security evaluation is defined, and an evaluation assurance level (EAL) is defined. A certification authority that is the third party performs security evaluation of the SE chip 21, certifies that a security function of the SE chip 21 satisfies, for example, an evaluation assurance level (for example, EAL 5+) designated by a service provider (a service provider or the like using the SE chip 21) using the SE chip on the user terminal, for an application for evaluation and authentication from a SE chip provider such as a chip manufacturer, and assigns an authentication certificate. The security authentication has an expiration date, for example, five years after the security authentication is the expiration date. However, the expiration date of the security authentication is not limited to five years. The processing proceeds from step S1 to step S2.

In step S2, communication connection is established between the user terminal 11 (first communication unit 23) and the SE management server 41 (first communication unit 53) with the first activation of the user terminal 11 or the first activation of the SP application as a trigger, and the SE unique identifier stored in the SE unique identifier storage unit 31 in the SE chip 21 is read and transmitted to the SE management server 41. The processing proceeds from step S2 to step S3.

In step S3, the SE management server 41 (SE chip management unit 51) registers (stores) the SE unique identifier transmitted in step S2 in a storage unit (not illustrated). As a result, the SE management server 41 is in a state in which the security authentication information for the SE chip 21 can be interpreted in association. The processing proceeds from step S3 to step S4.

In step S4, in order to make the SP service available, the user terminal 11 (user application execution unit 22) executes processing of the SP application according to the user's operation, and establishes communication connection between the user terminal 11 (first communication unit 23) and the SP server 71 (first communication unit 82). The SE chip 21 reads the SE unique identifier stored in the SE unique identifier storage unit 31 and notifies the user management unit 81 of (transmits) the SP server 71 of the read SE unique identifier. The processing proceeds from step S4 to step S5.

In step S5, the SP server 71 (user management unit 81) establishes communication connection between the SE management server 41 (second communication unit 54) and the SP server 71 (second communication unit 83). The user management unit 81 inquires of the SE management server 41 (SE chip management unit 51) the expiration date of the security authentication for the target SE unique identifier acquired in step S4. The processing proceeds from step S5 to step S6.

In step S6, the SE management server 41 (SE chip management unit 51) notifies the SP server 71 (user management unit 81) of (transmits) the expiration date of the security authentication in the security authentication information for the SE unique identifier inquired in step S6. Note that, information other than the expiration date of the security authentication in the security authentication information may also be transmitted to the SP server 71. The processing proceeds from step S6 to step S7.

In step S7, the SP server 71 (user management unit 81) sets a validity period of the SP service (SP service validity period) according to the expiration date of the security authentication acquired in step S6, for an application (hereinafter, referred to as SP Applet) related to the SP service executed by the application execution unit 32 in the SE chip 21 of the user terminal 11. For example, the validity period of the SP service may be set to a period shorter than the number of days from a current date to a date on which the expiration date of the security authentication of the SE chip 21 expires, or the SP service may be valid only in a case where the number of days from the current date to the date on which the expiration date of the security authentication of the SE chip 21 expires is greater than or equal to a specified number of days determined in advance.

According to the procedure example in FIG. 2, setting of the SP service is appropriately performed according to the expiration date of the security authentication of the SE chip 21. Furthermore, the service provider (SP) itself does not need to manage the expiration date of the security authentication in the SE chip 21, and can easily perform life cycle management of the SP service on the basis of information regarding the expiration date provided from the SE management server 41.

Update of Security Authentication Information by Update of SE OS

FIG. 3 is a diagram illustrating a procedure example of updating the security authentication information by update of the SE OS after the security authentication information is registered according to the procedure example in FIG. 2 in the information processing system in FIG. 1.

In step S21, the SE management server 41 (SE chip management unit 51) acquires the security authentication information for the updated SE unique identifier registered in step S22 from the SE chip security authentication information input unit 52. In the security authentication information input at this time, a change (extension, or the like) is may be performed for the expiration date of the security authentication of the SE chip 21 by the update of the SE OS. The SE chip management unit 51 registers (stores) the acquired security authentication information in a storage unit (not illustrated) in association with the SE unique identifier. The processing proceeds from step S21 to step S22.

In step S22, when the update of the SE OS in the SE chip 21 of the user terminal 11 is performed, communication connection is established between the user terminal 11 (first communication unit 23) and the SE management server 41 (first communication unit 53), and the updated SE unique identifier stored in the SE unique identifier storage unit 31 in the SE chip 21 is read and transmitted to the SE management server 41. Here, it is assumed that the SE OS version information in the information included in the SE unique identifier stored in the SE unique identifier storage unit 31 has been updated by the update of the SE OS. The processing proceeds from step S22 to step S23.

In step S23, the SE management server 41 (SE chip management unit 51) registers (stores) the updated SE unique identifier transmitted in step S21 in a storage unit (not illustrated). The processing proceeds from step S23 to step S24.

In step S24, the SE management server 41 (SE chip management unit 51) establishes communication connection between the SE management server 41 (second communication unit 54) and the SP server 71 (user management unit 81) of the service provider providing the SP service using the SE chip 21 of the updated SE unique identifier, and performs notification (transmission) of the updated SE unique identifier and an updated expiration date of the security authentication in the security authentication information for the SE unique identifier. Note that, in a case where there is a plurality of service providers that provides the SP service using the SE chip 21 of the updated SE unique identifier, the SP server 71 of each service provider is notified of the updated expiration date of the security authentication. The processing proceeds from step S24 to step S25.

In step S25, the SP server 71 (user management unit 81) sets a new validity period of the SP service according to the updated expiration date of the security authentication acquired in step S24 for the SP service to be provided to the user terminal 11 on which the SE chip 21 of the updated SE unique identifier acquired in step S24 is mounted. Note that, in a case where the expiration date of the security authentication of the SE chip 21 is extended by the update of the SE OS, the validity period of the SP service may be extended accordingly, or there may be a case where the validity period of the SP service is not changed. The processing proceeds from step S25 to step S26.

In step S26, the user terminal 11 (user application execution unit 22) establishes communication connection between the user terminal 11 (first communication unit 23) and the SP server 71 (first communication unit 82) at the time when the user activates the SP application, or the like. The SE chip 21 reads the updated SE unique identifier stored in the SE unique identifier storage unit 31 and notifies the user management unit 81 of the SP server 71 of (transmits) the updated SE unique identifier. The processing proceeds from step S26 to step S27.

In step S27, in a case where the updated SE unique identifier of which notification is performed from the SE management server 41 in step S24 and the updated SE unique identifier of which notification is performed from the user terminal 11 in step S26 are of the SE chip 21 of the same individual, the SP server 71 (user management unit 81) sets the new validity period of the SP service set in step S25 for the SP Applet executed by the application execution unit 32 in the SE chip 21 of the user terminal 11.

According to the procedure example in FIG. 3, the validity period of the SP service can also be appropriately changed according to the change of the expiration date of the security authentication of the SE chip 21. Furthermore, the service provider (SP) itself does not need to manage the expiration date of the security authentication in the SE chip 21, and can easily perform life cycle management of the SP service on the basis of information regarding the expiration date provided from the SE management server 41.

Processing When Security Authentication Expiration Date is About to Expire

FIG. 4 is a diagram illustrating a procedure example of processing in a case where the expiration date of the security authentication of the SE chip 21 of the user terminal 11 is about to expire in the information processing system in FIG. 1.

In step S41, in a case where the expiration date of the security authentication is about to expire in the security authentication information for the SE unique identifier registered in a storage unit (not illustrated), that is, in a case where the number of days from the current date to the date on which the expiration date of the security authentication of the SE chip 21 expires is less than a specified number of days (for example, six months or the like) determined in advance, the SE management server 41 (SE chip management unit 51)

detects the SE unique identifier as the target SE unique identifier. The processing proceeds from step S41 to step S42.

In step S42, when detecting the target SE unique identifier whose expiration date of the security authentication of the SE chip 21 is about to expire, the SE management server 41 (the SE chip management unit 51) establishes communication connection between the SE management server 41 (the second communication unit 54) and the SP server 71 (the second communication unit 83), and notifies the SP server 71 (the user management unit 81) of (transmits) the target SE unique identifier and the security authentication information (the expiration date of the security authentication). Note that the SP server 71 may be notified that the expiration date of the security authentication is about to expire. Furthermore, the SP server 71 may inquire of the SE management server 41 the expiration date of the security authentication for a specific SE unique identifier (validity of the SE chip 21 of a predetermined user terminal 11), and in a response to the inquiry, in a case where the expiration date of the security authentication is about to expire, ACK may be returned from the SE management server 41 to the SP server 71. The processing proceeds from step S42 to step S43.

In step S43, the SP server 71 (user management unit 81) detects the SP service (with SP Applet installed) issued to the SE chip 21 of the target SE unique identifier acquired in step S42. The processing proceeds from step S43 to step S44.

In step S44, the user terminal 11 (user application execution unit 22) establishes communication connection between the user terminal 11 (first communication unit 23) and the SP server 71 (first communication unit 82) at the time when the user activates the SP application, or the like. The SE chip 21 reads the SE unique identifier stored in the SE unique identifier storage unit 31 and notifies the user management unit 81 of (transmits) the SP server 71 of the read SE unique identifier. The processing proceeds from step S44 to step S45.

In step S45, in a case where the SE unique identifier of which notification is performed from the SE management server 41 in step S42 and the SE unique identifier of which notification is performed from the user terminal 11 in step S44 are of the SE chip 21 of the same individual, the SP server 71 (user management unit 81) performs setting to invalidate the SP service for the SP Applet executed by the application execution unit 32 in the SE chip 21 of the user terminal 11. However, the response in a case where the expiration date of the security authentication is about to expire is not limited to the case of invalidating the SP service using the SE chip 21 whose expiration date of the security authentication is about to expire, and notification may be performed to the user that the expiration date of the security authentication is about to expire, and is not limited to a specific response.

According to the procedure example in FIG. 4, the setting of the SP service using the SE chip 21 can be automatically changed to an appropriate setting according to the expiration date (remaining period) of the security authentication of the SE chip 21. Furthermore, the service provider (SP) itself does not need to manage the expiration date of the security authentication in the SE chip 21, and can easily perform life cycle management of the SP service on the basis of information regarding the expiration date provided from the SE management server 41.

Specific Example at Time of Registration of SP Service

FIG. 5 is a diagram illustrating a procedure example when registration (first registration) for the SP service is performed with the user terminal 11. As the SP service, a service (referred to as A bank Pay) for paying a fee through payment by A bank is used as a specific example. In step S71, on the user terminal 11, the user activates an A bank Pay application that is a UI application of the A bank Pay, and inputs user information according to a guidance screen displayed on the display unit 24 of the user terminal 11. Next, in step S72, registration is performed of the user information to the A bank Pay application. At this time, communication connection is established between the user terminal 11 and the SP server 71 that provides A bank Pay, and notification and confirmation of the user information to the SP server 71 (user management unit 81) are performed. Furthermore, the display unit 24 of the user terminal 11 displays that the user information is being registered.

Next, in step S73, confirmation is performed of the validity of the SE chip 21 in which the user information is registered. In the confirmation of the validity of the SE chip 21, the SE unique identifier of the SE chip 21 is transmitted to the SP server 71, and the SP server 71 acquires information on the expiration date of the security authentication corresponding to the SE unique identifier from the SE management server 41. At this time, the display unit 24 of the user terminal 11 displays that the validity of the SE chip is being confirmed. However, a case may be adopted in which the confirmation of the validity of the SE chip 21 is performed in the background of step S72, and the fact that the validity of the SE chip is being confirmed is not displayed on the display unit 24.

Next, in step S74, when the validity of the SE chip 21 is confirmed, the user information is registered in the SP Applet of the A bank Pay executed in the SE chip 21 of the user terminal 11. The display unit 24 of the user terminal 11 displays that registration of the user information is completed. However, in a case where the validity of the SE chip 21 is not confirmed, the user information is not registered in the SP Applet, and the display unit 24 displays that effect. Determination of the validity of the SE chip 21 is performed on the basis of, for example, whether or not the expiration date of the security authentication of the SE chip 21 has a remaining period of a predetermined specified number of years (for example, three years) or more. In a case where the expiration date of the security authentication of the SE chip 21 has a remaining period greater than or equal to a specified number of years, it is determined that the SE chip 21 is valid as a requirement for using the A bank Pay, and in a case where the remaining period is only less than the specified number of years, it is determined that the SE chip 21 is not valid (invalid).

According to the procedure example in FIG. 5, the service provider (SP) itself does not need to manage the expiration date of the security authentication in the SE chip 21, and can easily perform appropriate setting of the SP service on the basis of the information regarding the expiration date provided from the SE management server 41.

Hardware Configuration

The series of processing described above can be executed by hardware and also can be executed by software. In a case where the series of processing is executed by software, a program constituting the software is installed in a computer. Here, examples of the computer include a computer incorporated in dedicated hardware, and for example, a general-purpose personal computer capable of executing various functions by installing various programs, or the like.

Figure 6:
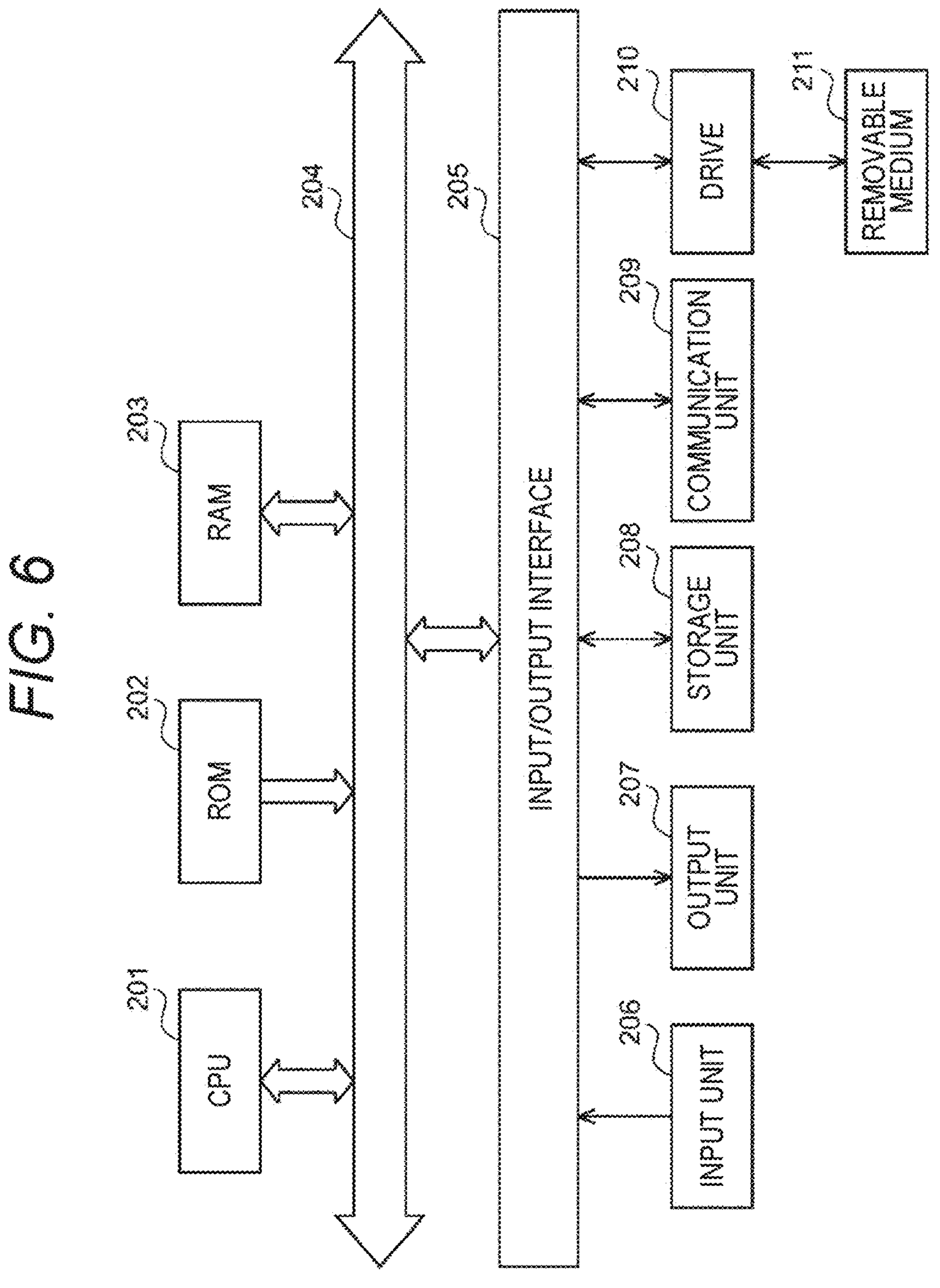
FIG. 6 is a block diagram illustrating a configuration example of an embodiment of a computer in which a program for executing a series of processing is installed.

FIG. 6 is a block diagram illustrating a configuration example of hardware of a computer that executes the series of processing described above by a program.

In the computer, a central processing unit (CPU) 201, a read only memory (ROM) 202, and a random access memory (RAM) 203 are connected to each other by a bus 204.

An input/output interface 205 is further connected to the bus 204. The input/output interface 205 is connected to an input unit 206, an output unit 207, a storage unit 208, a communication unit 209, and a drive 210.

The input unit 206 includes a keyboard, a mouse, a microphone, and the like. The output unit 207 includes a display, a speaker, and the like. The storage unit 208 includes a hard disk, a non-volatile memory, and the like. The communication unit 209 includes a network interface, and the like. The drive 210 drives a removable medium 211 such as a magnetic disk, an optical disk, a magneto-optical disk, or a semiconductor memory.

In the computer configured as described above, for example, the CPU 201 loads the program stored in the storage unit 208 into the RAM 203 via the input/output interface 205 and the bus 204 and executes the program, thereby performing the above-described series of processing.

The program executed by the computer (CPU 201) can be provided by being recorded on the removable medium 211 as a package medium or the like, for example. Furthermore, the program can be provided via a wired or wireless transmission medium such as a local area network, the Internet, or digital satellite broadcasting.

In the computer, the program can be installed in the storage unit 208 via the input/output interface 205 by loading the removable medium 211 in the drive 210. Furthermore, the program can be received by the communication unit 209 through the wired or wireless transmission medium to be installed on the storage unit 208. Additionally, the program can be installed in advance on the ROM 202 and the storage unit 208.

Note that the program executed by the computer may be a program in which processing is performed in time series in the order described in the present specification or may be a program in which processing is performed in parallel, or at a necessary timing such as when a call is made.

Note that, in the present specification, a system means an assembly of a plurality of components (devices, modules (parts), and the like), and it does not matter whether or not all the components are located in the same housing. Thus, a plurality of devices accommodated in separate housings and connected to each other via a network and one device in which a plurality of modules is accommodated in one housing are both systems.

Furthermore, for example, a configuration described as one device (or processing unit) may be divided and configured as a plurality of devices (or processing units). Conversely, configurations described above as a plurality of devices (or processing units) may be collectively configured as one device (or processing unit). Furthermore, it goes without saying that a configuration other than the above-described configurations may be added to the configuration of each device (or each processing unit). Moreover, when the configuration and operation as the entire system are substantially the same, a part of the configuration of a certain device (or processing unit) may be included in the configuration of another device (or another processing unit).

Furthermore, for example, the present technology can be configured as cloud computing in which one function is shared and jointly processed by a plurality of devices through the network.

Furthermore, for example, the program described above can be executed by any device. In that case, the device is only required to have a necessary function (functional block and the like) to be enabled to obtain necessary information.

Furthermore, for example, each step described in the above-described procedure example can be executed by one device or can be shared and executed by a plurality of devices. Moreover, in a case where a plurality of pieces of processing is included in one step, the plurality of pieces of processing included in the one step can be executed by one device or executed by a plurality of devices in a shared manner. In other words, a plurality of pieces of processing included in one step can also be executed as pieces of processing in a plurality of steps. Conversely, processing described as a plurality of steps can also be collectively executed as one step.

Furthermore, in the program executed by the computer, pieces of processing in steps describing the program may be executed in time series in the order described in the present specification, or may be executed in parallel, or independently at a necessary timing such as when a call is made. That is, the pieces of processing of the respective steps may be executed in an order different from the above-described order as long as there is no contradiction. Moreover, the pieces of processing in steps describing the program may be executed in parallel with processing of another program, or may be executed in combination with the processing of the other program.

Furthermore, a plurality of the present technologies that has been described in the present specification can each be implemented independently as a single unit unless there is a contradiction. It goes without saying that any plurality of present technologies can be implemented in combination. For example, a part or all of the present technologies described in any of the embodiments can be implemented in combination with a part or all of the present technologies described in other embodiments. Furthermore, a part or all of any of the above-described present technologies can be implemented together with another technology that is not described above.

Examples of Configuration Combinations

Note that the present technology can also have the following configurations.

(1)

An information processing device including:

a storage unit that stores unique identification information for identifying an individual of a secure element mounted on a terminal device and security authentication information assigned to the secure element in association with each other; and a communication unit that transmits, to an external device that provides a service by using the secure element of the terminal device, the unique identification information inquired from the external device or the security authentication information for the unique identification information on the secure element used for the service.

(2)

The information processing device according to (1), in which the security authentication information includes information on an expiration date of security authentication.

(3)

The information processing device according to (1) or (2), in which the security authentication information is security authentication information for security functions of hardware and an OS of the secure element.

(4)

The information processing device according to (3), in which the storage unit updates the security authentication information with update of the OS.

(5)

The information processing device according to (2), in which the communication unit transmits the unique identification information and the security authentication information on the secure element used for the service to the external device in a case where the number of days from a current date to a date on which an expiration date of the security authentication expires is less than a specified number of days.

(6)

An information processing device including:

an acquisition unit that acquires security authentication information assigned to a secure element mounted on a terminal device; and a management unit that sets a validity period of a service provided by using the secure element of the terminal device on the basis of the security authentication information.

(7)

The information processing device according to (6), in which the security authentication information includes information on an expiration date of security authentication.

(8)

The information processing device according to (6) or (7), in which the security authentication information is security authentication information for security functions of hardware and an OS of the secure element.

(9)

The information processing device according to (8), in which the management unit changes the validity period of the service with update of an expiration date of the security authentication by update of the OS.

(10)

The information processing device according to (7), in which the acquisition unit acquires, from an external device, unique identification information for identifying an individual of the secure element used in the service and the security authentication information in a case where the number of days from a current date to a date on which an expiration date of the security authentication expires is less than a specified number of days.

(11)

The information processing device according to (10), in which the management unit invalidates the service provided to the terminal device in the case where the number of days from the current date to the date on which the expiration date of the security authentication expires is less than the specified number of days.

(12)

An information processing device including a communication unit that transmits, to an external device, unique identification information for identifying an individual of a secure element mounted inside.

(13)

An information processing method, in which in an information processing device including a storage unit and a communication unit, the storage unit stores unique identification information for identifying an individual of a secure element mounted on a terminal device and security authentication information assigned to the secure element in association with each other, and the communication unit transmits, to an external device that provides a service by using the secure element of the terminal device, the unique identification information inquired from the external device or the security authentication information for the unique identification information on the secure element used for the service.

(14)

A program for causing a computer to function as:

a storage unit that stores unique identification information for identifying an individual of a secure element mounted on a terminal device and security authentication information assigned to the secure element in association with each other; and a communication unit that transmits, to an external device that provides a service by using the secure element of the terminal device, the unique identification information inquired from the external device or the security authentication information for the unique identification information on the secure element used for the service.

REFERENCE SIGNS LIST

11 User terminal
21 SE chip
22 User application execution unit
23, 53, 82 First communication unit
24 Display unit
31 SE unique identifier storage unit
32 Application execution unit
41 SE management server
51 SE chip management unit
52 SE chip security authentication information input unit
54, 83 Second communication unit
71 SP server
81 User management unit

The invention claimed is:

1. An information processing device comprising:

a non-transitory computer-readable storage medium configured to store unique identification information for identifying an individual of a secure element mounted on a terminal device and security authentication information assigned to the secure element in association with each other; and circuitry configured to transmit, to an external device that provides a service by using the secure element of the terminal device, the unique identification information inquired from the external device or the security authentication information for the unique identification information on the secure element used for the service, wherein at least one of the unique identification information or the security authentication information is updated when an operating system (OS) of the secure element is updated.

2. The information processing device according to claim 1, wherein the security authentication information includes information on an expiration date of security authentication.

3. The information processing device according to claim 1, wherein the security authentication information is security authentication information for security functions of hardware and the OS of the secure element.

4. The information processing device according to claim 3, wherein the non-transitory computer-readable storage medium is further configured to update the security authentication information when the OS is updated.

5. The information processing device according to claim 2, wherein the circuitry transmits the unique identification information and the security authentication information on the secure element used for the service to the external device in a case where a number of days from a current date to a date on which an expiration date of the security authentication expires is less than a specified number of days.

6. An information processing device comprising:

circuitry configured to acquire security authentication information assigned to a secure element mounted on a terminal device, and set a validity period of a service provided by using the secure element of the terminal device based on the security authentication information, wherein the security authentication information is updated when an operating system (OS) of the secure element is updated.

7. The information processing device according to claim 6, wherein the security authentication information includes information on an expiration date of security authentication.

8. The information processing device according to claim 6, wherein the security authentication information is security authentication information for security functions of hardware and an operating system (OS) of the secure element.

9. The information processing device according to claim 8, wherein the circuitry is further configured to change the validity period of the service with update of an expiration date of the security authentication by update of the OS.

10. The information processing device according to claim 7, wherein the circuitry is further configured to acquire, from an external device, unique identification information for identifying an individual of the secure element used in the service and the security authentication information in a case where a number of days from a current date to a date on which an expiration date of the security authentication expires is less than a specified number of days.

11. The information processing device according to claim 10, wherein the circuitry is further configured to invalidate the service provided to the terminal device in the case where the number of days from the current date to the date on which the expiration date of the security authentication expires is less than the specified number of days.

12. An information processing device comprising:

circuitry configured to acquire unique identification information for identifying an individual of a secure element mounted inside the information processing device, and transmit, to an external device, the unique identification information for identifying the individual of the secure element, wherein the unique identification authentication information is updated when an operating system (OS) of the secure element is updated.

13. An information processing method, executed by an information processing device including a non-transitory computer-readable storage medium and a circuitry, the method comprising:

storing, by the non-transitory computer-readable storage medium, unique identification information for identifying an individual of a secure element mounted on a terminal device and security authentication information assigned to the secure element in association with each other; and transmitting, by the circuitry, to an external device that provides a service by using the secure element of the terminal device, the unique identification information inquired from the external device or the security authentication information for the unique identification information on the secure element used for the service, wherein the unique identification authentication information is updated when an operating system (OS) of the secure element is updated.

14. A non-transitory computer-readable storage medium having embodied thereon a program, which when executed by a computer causes the computer to execute a method, the method comprising:

storing unique identification information for identifying an individual of a secure element mounted on a terminal device and security authentication information assigned to the secure element in association with each other; and transmitting, to an external device that provides a service by using the secure element of the terminal device, the unique identification information inquired from the external device or the security authentication information for the unique identification information on the secure element used for the service, wherein the unique identification authentication information is updated when an operating system (OS) of the secure element is updated.

* * * * *